United States Patent
Birnkrant et al.

(10) Patent No.: US 11,880,013 B2
(45) Date of Patent: Jan. 23, 2024

(54) SCREENING SYSTEM

(71) Applicant: Carrier Corporation, Palm Beach Gardens, FL (US)

(72) Inventors: Michael J. Birnkrant, Wethersfield, CT (US); Peter R. Harris, Jupiter, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 321 days.

(21) Appl. No.: 17/054,210

(22) PCT Filed: May 10, 2019

(86) PCT No.: PCT/US2019/031658
§ 371 (c)(1),
(2) Date: Nov. 10, 2020

(87) PCT Pub. No.: WO2019/217779
PCT Pub. Date: Nov. 14, 2019

(65) Prior Publication Data
US 2021/0072419 A1  Mar. 11, 2021

Related U.S. Application Data

(60) Provisional application No. 62/670,141, filed on May 11, 2018.

(51) Int. Cl.
*G01V 3/165* (2006.01)
*G01V 8/00* (2006.01)
*G07C 9/30* (2020.01)

(52) U.S. Cl.
CPC .............. *G01V 3/165* (2013.01); *G01V 8/005* (2013.01); *G07C 9/30* (2020.01)

(58) Field of Classification Search
CPC .. G01V 5/0025; G01V 5/0008; G01V 5/0016; G01V 5/0033; G01V 5/0041;
(Continued)

(56) References Cited

U.S. PATENT DOCUMENTS 6,094,472 A    7/2000  Smith
7,005,982 B1*  2/2006  Frank .................... G01N 21/35
                                                        436/57
(Continued)

FOREIGN PATENT DOCUMENTS

CN     201198430 Y    2/2009
WO   12009023314 A2   2/2009
(Continued)

OTHER PUBLICATIONS

Hantscher, Sebastian, et al. "Security Pre-screening of Moving Persons Using a Rotating Channel W-Band Radar," Published in IEEE Transaction on Microwave Theory and Techniques (pp. 870-880, vol. 60, Issue: 3, Mar. 2012), Publisher: IEEE, Publication date: Feb. 6, 2012. http://ieeexplore.ieee.org/document/6146384/.
(Continued)

*Primary Examiner* — Yoshihisa Ishizuka
*Assistant Examiner* — Carter W Ferrell
(74) *Attorney, Agent, or Firm* — Carlson, Gaskey & Olds, P.C.

(57) ABSTRACT

An example screening system includes a plurality of detectors about a screening area. Each detector includes a sensor configured to detect information from one or more objects moving along a path from an entrance to an exit of the screening area. The plurality of detectors include a first detector configured to detect information from a first location of the path, and a second detector configured to detect information from a second location of the path. The second detector is configured to adapt its functionality based on a finding of the first detector for a given one of the one or more objects.

22 Claims, 6 Drawing Sheets

(58) Field of Classification Search
CPC .... G01V 5/005; G01V 5/0058; G01V 5/0066; G01V 5/0069; G01V 11/00; G01V 3/08; G01V 3/081; G01V 3/10; G01V 3/165; G01V 8/005; G01V 3/00; G07C 9/30; G01N 23/04; G01N 2001/022

See application file for complete search history.

(56) References Cited

U.S. PATENT DOCUMENTS

| | | | |
|---|---|---|---|
| 7,830,254 B2 | 11/2010 | Huey et al. | |
| 8,357,902 B2 | 1/2013 | Chawla | |
| 9,564,034 B2 | 2/2017 | Foster et al. | |
| 2003/0114986 A1* | 6/2003 | Padmanabhan | G16Z 99/00 702/19 |
| 2006/0098773 A1* | 5/2006 | Peschmann | G01N 23/04 378/57 |
| 2006/0226998 A1 | 10/2006 | Wilson | |
| 2006/0257853 A1* | 11/2006 | Herman | G08B 21/12 435/5 |
| 2007/0230656 A1 | 10/2007 | Lowes et al. | |
| 2008/0144885 A1 | 6/2008 | Zucherman et al. | |
| 2008/0212742 A1 | 9/2008 | Hughes | |
| 2008/0267350 A1 | 10/2008 | Gray | |
| 2009/0248319 A1* | 10/2009 | Call | G01N 1/405 378/57 |
| 2014/0369468 A1* | 12/2014 | Harding | G01V 5/0033 378/57 |
| 2015/0110250 A1* | 4/2015 | Gray | G01V 5/0025 378/87 |
| 2015/0186732 A1 | 7/2015 | Perron | |
| 2019/0239753 A1* | 8/2019 | Wentz | H01J 31/501 |
| 2019/0353817 A1* | 11/2019 | Monnier | G01N 33/0057 |

FOREIGN PATENT DOCUMENTS

| | | |
|---|---|---|
| WO | 2010076261 A1 | 7/2010 |
| WO | 2010140943 A1 | 12/2010 |

OTHER PUBLICATIONS

International Search Report and Written Opinion for International Patent Application No. PCT/US2019/031658 dated Nov. 26, 2019.

* cited by examiner

SCREENING SYSTEM

CROSS-REFERENCE TO RELATED APPLICATIONS

This is a national stage application, filed under 35 U.S.C. § 371, of International Patent Application No. PCT/US2019/031658, which was filed on May 10, 2019, which claims the benefit of U.S. Provisional Patent Application No. 62/670,141, which was filed on May 11, 2018, each of which is incorporated by reference herein in its entirety.

BACKGROUND

This application relates to security screening.

It is known to provide security screening at a variety of locations where people congregate. For example, passengers and their baggage are screened for prohibited items at airports. Also, people and their belongings are sometimes screened for prohibited items at concerts and sporting events. Speed is a factor in screening, as screening checkpoints can become bottlenecks.

SUMMARY

A screening system according to an example of the present disclosure includes a plurality of detectors about a screening area. Each detector including a sensor is configured to detect information from one or more objects moving along a path from an entrance to an exit of the screening area. The plurality of detectors includes a first detector configured to detect information from a first location of the path, and a second detector configured to detect information from a second location of the path. The second detector is configured to adapt its functionality based on a finding of the first detector for a given one of the one or more objects.

In a further embodiment of any of the foregoing embodiments, the first and second detectors are each configured to analyze chemical information from the objects, and the second detector utilizes a detection library and is configured to eliminate items from its detection library from consideration for the given one of the one or more objects based on the chemical information gathered by the first detector for the given one of the one or more objects.

In a further embodiment of any of the foregoing embodiments, the detection library includes at least one of the following groups of restricted compounds: chemical warfare agents, biological warfare agents, toxic industrial chemicals, explosives, narcotics, and radiological materials.

In a further embodiment of any of the foregoing embodiments, the chemical information gathered by the first detector which is a fluorescent response of an analyte sampled from the given one of the one or more objects.

In a further embodiment of any of the foregoing embodiments, to adapt its functionality, the second detector is configured to adapt one or more of the following: dwell time, illumination intensity, wavelength, spot size, detection threshold, and library of target compounds.

In a further embodiment of any of the foregoing embodiments, a controller includes a processor is configured to correlate data from the plurality of detectors for the given one of the one or more objects, and determine a security risk for the given one of the one or more objects based on the correlated data.

In a further embodiment of any of the foregoing embodiments, the one or more objects are first objects, the screening area is a first screening area, and the screening system includes a third detector situated in a second screening area that is separate from the first screening area. The third detector is configured to detect information from one or more second objects associated with particular ones of the one or more first objects. The controller is configured to further base its determination of the security risk for the given one of the first objects on data from the third detector for a given one of the one or more second objects that is associated with the given one of the first objects.

In a further embodiment of any of the foregoing embodiments, the controller is configured to change how the third detector analyzes a particular one of the second objects based on data from one or more of the detectors for a particular one of the first objects that is associated with the particular one of the second objects.

In a further embodiment of any of the foregoing embodiments, the controller is configured to modify a dictionary or one or more weighting factors that the third detector uses to analyze the particular one of the second objects based on the data from one or more of the detectors for the particular one of the first objects that is associated with the particular one of the second objects.

In a further embodiment of any of the foregoing embodiments, the controller is configured to change how one or more of the plurality of detectors analyze a particular one of the first objects based on data from the third detector for a particular one of the second objects that is associated with the particular one of the first objects.

In a further embodiment of any of the foregoing embodiments, the controller is configured to modify a dictionary or one or more weighting factors that one of the detectors uses to analyze the particular one of the first objects based on the data from one or more of the detectors for the particular one of the second objects that is associated with the particular one of the first objects.

In a further embodiment of any of the foregoing embodiments, a conveyor is configured to move the one ore more second objects through the second screening area.

In a further embodiment of any of the foregoing embodiments, an imaging device is configured to record images of objects moving along the path, and the controller is configured to correlate the images of individual ones of the first objects with the data from the plurality of detectors for those individual objects.

In a further embodiment of any of the foregoing embodiments, the controller is configured to assign an electronic tag to images of a particular first object and to data related to the first object from one or more of the detectors as part of the correlation.

In a further embodiment of any of the foregoing embodiments, the objects are humans, and the imaging device is a third detector configured to screen the humans for one or more biological or behavioral characteristics.

In a further embodiment of any of the foregoing embodiments, the one or more bodily threat indications include one or more of body temperature above a predefined threshold, sweating, fidgeting, and human bulkiness.

In a further embodiment of any of the foregoing embodiments, an automated transport device is configured to move the objects from the entrance to the exit of the screening area along the path.

In a further embodiment of any of the foregoing embodiments, the automated transport device includes a moving walkway.

In a further embodiment of any of the foregoing embodiments, the moving walkway includes a skirt guard, and at least one of the first and second detectors is disposed within the skirt guard. The skirt guard includes at least one aspirating inlet that provides fluid communication between the object and at least one of the plurality of detectors.

In a further embodiment of any of the foregoing embodiments, one of the plurality of detectors is a metal detector.

In a further embodiment of any of the foregoing embodiments, one of the plurality of detectors is a millimeter wave scanner.

A method of installing detectors about a screening area according to an example of the present disclosure includes installing a first detector and installing a second detector about a screening area. The first detector is configured to detect information from one or more objects at a first location on a path between an entrance and an exit of the screening area. The second detector is configured to detect information from the one or more objects at a second location on the path that is different from the first location. The method also includes adapting functionality of the second detector for a given one of the one or more objects based on a finding of the first detector for the given one of the one or more objects.

In a further embodiment of any of the foregoing embodiments, the adapting includes eliminating compounds from a detection library of the second detector from consideration for the given one of the one or more objects based on the chemical information gathered by the first detector for the given one of the one or more objects.

In a further embodiment of any of the foregoing embodiments, the path includes a moving walkway configured to move the objects towards the exit, and the first and second locations are locations along the moving walkway.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
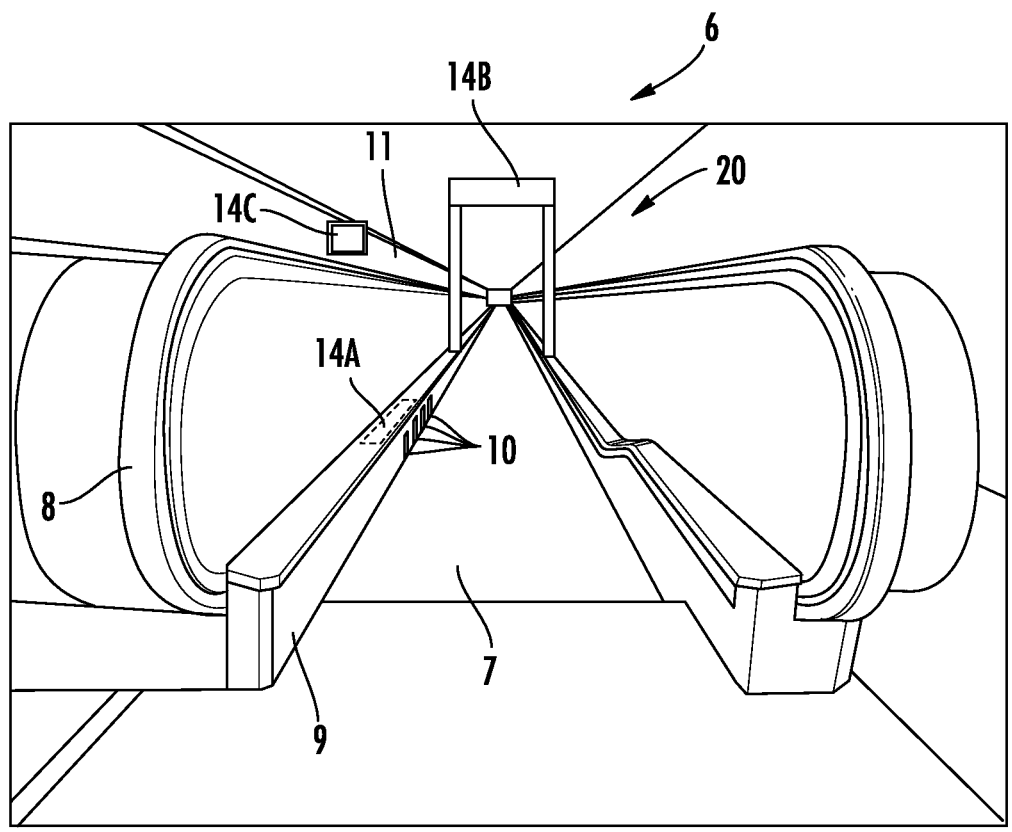
FIG. 1 illustrates an example screening system that includes a plurality of detectors for a screening area.

As screening checkpoints can become bottlenecks in locations where people congregate, it is desirable to increase the throughput of people at checkpoints by improving the inflow and outflow from these locations, resulting in an improved experience for visitors. An exemplary system described herein is capable of achieving integration of movement and screening, and automating certain security functions. FIG. 1 illustrates an example screening system 6 that includes a plurality of detectors 14A-C for a screening area 20 that includes a moving walkway 7. The detectors 14 are configured to detect information about people, animals, and/or objects (collectively "objects") moving along the moving walkway 7 within the screening area 20. The collected "information" can include data for a chemical analysis or a physical analysis, for example.

The moving walkway 7 may include a handrail 8 and a skirt guard 9. The skirt guard 9 may include a plurality of aspirating inlets 10 configured to suck air into the skirt guard 9 and provide for fluid communication between an object on the moving walkway 7 and a detector 14A that is housed within the skirt guard 9. Although only one detector 14A is shown in the skirt guard 9, it is understood that multiple detectors 14A could be housed within the skirt guard 9. An additional detector 14B may straddle the moving walkway 7 so that an object can be scanned while being moved along the moving walkway 7. Also, a detector 14C may be situated on a wall 11 that is proximate to the moving walkway 7. Although detector 14C is shown situated on the wall 11, detector 14C may be situated on the ceiling or other surface proximate to the moving walkway 7. In one example, the detector 14A is a chemical sniffer, the detector 14B is a metal detector, and the detector 14C is an imaging device. Below, reference numerals 6, 7, 14, and 20 are generically used without being limited to the example of FIG. 1.

Note that although FIG. 1 depicts a moving walkway, a screening area 20 may include a hallway 7 with aspirating inlets 10 present in a skirting between a wall and the floor, in a wall, or in a floor or ceiling of the screening area 20. Likewise, in alternative embodiments, one or more detectors 14A may be housed within skirting 9 or alternatively within a wall, floor, or ceiling, for example near an aspirating inlet 10 which may appear to be an air vent; one or more detectors 14B may be housed within an arch or other structure straddling a hallway 7; and one or more detectors 14C may be situated on a wall, ceiling, or other surface proximate to the hallway 7. Thus, in alternative embodiments screening system 6 may be deployed in any relatively confined space such as, for example, a hallway, moving walkway, conveyor, escalator, or any similar space where people, animals, and/or objects are likely to transit.

Figure 2:
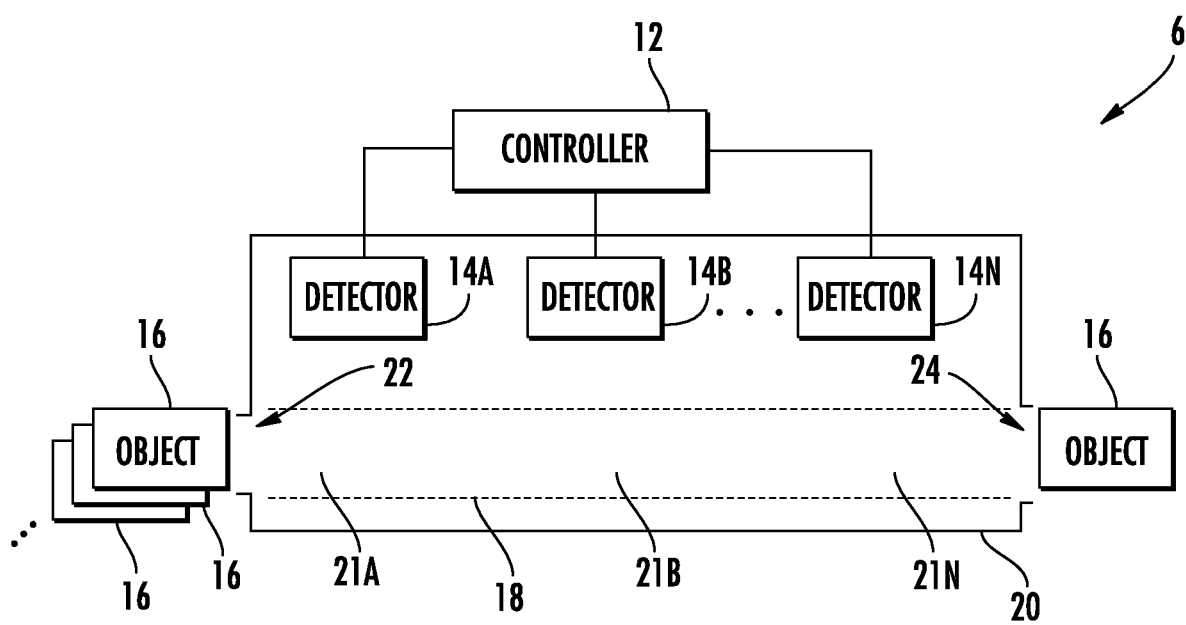
FIG. 2 is a schematic view of an example screening system that utilizes a plurality of detectors.

FIG. 2 is a schematic view of an example screening system 6 that includes a controller 12 and a plurality of detectors 14. One or more objects 16 move along a path 18 within screening area 20, and the path 18 includes a plurality of locations 21A-N. In one example, the path 18 includes a moving walkway 7 (as shown in FIG. 1). Detector 14A is configured to detect information from objects 16 at location 21A on the path 18, detector 14B is configured to detect information from objects 16 at location 21B on the path 18, and so on. The location 21B is subsequent to the location 21A on the path 18, and so on. The path 18 extends from an entrance 22 to an exit 24 of the screening area 20. In one example, the objects 16 are people, animals, and/or baggage and the screening area 20 is part of a location where people congregate such as an airport terminal, theater entrance, or stadium entrance.

The screening system 6 is utilized to detect threats in areas where it is desirable to screen for hazardous conditions and materials, such as buildings, facilities, factories, special events, work zones, transportation centers, government buildings, high value assets, activities, and objects. In a sequential screening system as shown in FIGS. 1-2, the screening occurs as the objects 16 move through the screening system 6. The screening system 6 utilizes multiple detectors 14 to inspect people and belongings with each detector 14 utilizing the results of previous detectors 14 to modify their functionality to enhance detection performance. As used herein, "functionality" can refer to variable capabilities within the range of performance of the device, including but not limited to, for example: dwell time, illumination intensity, wavelength, spot size, detection thresholds, and library of targets interrogated. In some embodiments, a change in functionality may include disabling a capability in order to speed or intensify performance of a different capability. The functionality modification may include a change in a detection library or a change in a fitting function (such as equation 1 below), for example.

Each location 21 is within the detection area of its respective detector 14. In one example, these detection areas are non-overlapping, such that each detector 14 has its own discrete detection area that is not shared with another detector 14. In another example, the detection areas do overlap. In one such example, the detection areas of a pair of detectors 14 overlap when the first detector 14 of the pair can complete its detection function while still providing adequate time for the second detector 14 in the pair to modify its functionality based on the detection of the first detector 14. In another example, one pair of detectors may have substantially similar functions but each have a different detection area, e.g. the front or back of an object moving along a path 18, or a pair of detectors may be positioned on opposite walls 11 or a ceiling along a line substantially perpendicular to path 18 such that each detector 14 has an opposite or mirror-angled line of sight to objects side by side on walkway 7, but the pair may nevertheless have detection areas that overlap.

At least one of the detectors 14 may be characterized as a situational awareness detector that provides information on the characteristics of the objects 16 that impact its measurements. In one such example in which the first detector 14A is a situational awareness detector, the detector 14A takes an initial evaluation of an object 16 to determine information about the object 16, such as one or more of chemical composition, orientation, distance, perspective, reflectivity, and other environmental factors to be associated with the detection spectra. The data is then used to refine the functionality of subsequent detectors 14B-N (e.g., the data collected by those detectors) by modifying their functionality and/or respective detection algorithms In this fashion, a composite spectrum is developed to predict a substrate/background in the region of interest. In order to enable this determination, a reduced order optical system model may be applied to the data associated with the object. Optical measurements can be affected by optical effects such as skew, interference, resonance and frequency shifting. By subtracting the composite spectrum from the measured spectrum, background substrate interactions (skew, interference, resonance and frequency shifting) can be eliminated.

At least one of the detectors 14 may be characterized as a prioritization detector which may include an imaging device (e.g., a camera or imaging device such as thermal imaging devices, radar, sonar, etc.) and is utilized to identify specific regions of interest for the objects 16 (e.g., handles of luggage or the hands of a people). The recognition problem of locating parts/attributes within a larger object or environment poses a challenge. Appearance changes due to factors such as changes in illumination, pose, or even clutter cause visual ambiguity (i.e., the same object looks different when viewed from different angles). In one example, a Convolutional Deep Neural Network (CDNN) may be used to address this challenge by localizing features of interest in camera imagery for subsequent detector 14 inspection.

The CDNN may require initial training and test datasets to discern areas of interest. In one example, the Caffe deep learning framework may be utilized to for training the CDNN on how to discriminate objects, such as hands and handles of luggage, which is useful in determining associations between people and luggage. As objects 16 move through the screening area 20, perspective can change, so tracking moving objects 16 such as people and belongings in images, e.g., in surveillance video, may be achieved using Kalman and Particle filters.

At least one of the detectors 14 may be characterized as a non-contact sensor (or "standoff detector") that does not require contact with an object 16 to sense a characteristic of the object 16. The standoff detector 14 inspects objects for threats and may utilize information from one or more situational awareness and/or prioritization detectors 14. A standoff detector 14 typically uses non-contact methods to identify threats. Some example standoff detectors known in the art may include but are not limited to any of chemical sniffers, metal detectors, X-ray scanners, millimeter wave scanners, thermal scanners, UV detectors, optical scanners, laser induced breakdown spectroscopy scanners, and standoff photoacoustic spectroscopy scanners, for example.

All such detectors remotely scan within a detection area, and may be used alone or in combination to identify specific types of threats. For example, a chemical sniffer 14 may be configured to obtain information of chemicals present on or about an object 16. A chemical sniffer 14 may include a detection library of groups of restricted chemicals compounds which are typically indicative of one or more of the following example threats or threat classes, such as: chemical warefare agents (CWA) (e.g., sarin, soman, and cyclosarin), biological warfare agents (BWA) (e.g., plague, smallpox, and anthrax), toxic industrial chemicals (e.g., phosgene, sulfuric acid, and nitric acid), explosives (e.g., dynamite), narcotics (e.g., methamphetamine, heroin, cocaine), and radiological materials (e.g., plutonium and uranium), and other chemicals and materials hazardous to humans, animals or property. A person of ordinary skill in the art would be familiar with particular detection devices configured to detect such threats or threat classes.

In another example, a metal detector 14 may be configured to detect metal on or in an object 16. In a further example, an X-ray scanner 14 may obtain an X-ray image of an object (e.g., for detecting metal). In further examples: millimeter wave scanner 14 is configured to detect items concealed by or within an object 16. A thermal scanner 14 is configured to detect a thermal profile of an object 16, which may be useful for determining a physiological or biological characteristic of a person, such as body temperature. A UV detector 14 is configured to detect a fluorescent response of an object 16, which can be an identifying chemical trait. An optical scanner 14 is configured to analyze images of an object 16 to determine behavioral characteristics (e.g., fidgeting, coughing, bulkiness, etc.). In one example, the optical scanner includes a shortwave infrared (SWIR) scanner and/or longwave infrared (LWIR) scanner. The foregoing are non-limiting examples, and other types of detectors 14 could be used.

As described above, the functionality of one or more exemplary detectors 14 may be modified to enhance detection performance of the detector 14, of another detector 14, or of the screening system 6 as a whole. At least one of the detectors 14 is configured to adapt its functionality for a given one of the objects 16 based on a finding of a preceding detector 14 in the screening area 20 for the given one of the objects 16.

In one example, with respect to an exemplary chemical sniffer 14B with a detection library as described above, an exemplary functionality adaptation includes eliminating items from the detection library for consideration during the scanning and analysis of a given one of the objects 16 based on chemical information gathered by a preceding detector 14 for the object 16. In one such example, detector 14A is a UV detector that determines a fluorescent response for an analyte sampled from a given one of the objects 16, and detector 14B excludes items from its detection library that could not provide the detected fluorescent response. This could potentially narrow a library of thousands of compounds down to a library of under one hundred compounds, providing for speed and overall efficiency improvements in the screening system 6.

Identifying the chemical components of an analyte is a challenge because there are hundreds or thousands of possible constituent chemicals. Given that any output for chemical identification of a threat should be sparse—a mixture of relatively few significant things—an algorithm within detector 14 and/or controller 12 may efficiently identify potential threats by, for example, using a mixed-norm, sparse optimization approach. A representative method utilizes an Akaike information criterion (AIC) for model order selection. That is, $$\min \|y - Ax\|_2 + \mu \|x\|_1, s.t. \; x \geq 0 \quad \text{(equation 1)}$$

where A is the matrix of known or measured chemical spectra (the library), y is the measured analyte, x is the desired sparse vector representing the concentration of each component from the library that is in the analyte, and $\mu$ is a weight factor between accuracy and model order as explained below. A processor 30 in detector 14 and/or controller 12 may be configured to execute the algorithm (see FIGS. 3-4, described below).

In order to speed detection, an optimization-based approach can be applied to solve equation 1. As also explained above, modification of the library within a detector 14B may be based on the output of a previous detector 14A. In one example, the first detector 14A may be capable of scanning for threats that absorb IR light between 10-14 um. Based on the result from detector 14A, controller 12 may modify the library of a second detector 14B capable of determining absorption of UV light (or the second detector 14B may modify its own library). For example, if during scanning and analysis of objects 16 first detector 14A determines the presence or absence of chemical agents hazardous to humans (for example, those known to be used in chemical warfare) which are detectable in the wavelength range of 10-14 um. While scanning object 16 the second detector 14B may modify its functionality by eliminating entries in the library that are consistent or inconsistent with the hazardous chemical agents as determined by detector 14A. In the present example, the hazardous chemical agents can be eliminated if no absorption was recorded or, if absorption was recorded, the library would be refined to only the hazardous chemical agents.

In the above-described configuration, another parameter that may be tuned to adjust the functionality of a detector 14B is the choice of the factor $\mu$ which controls the tradeoff between sparsity (number of constituent chemicals) and accuracy (ability to match the measured spectrum). Rather than trying to select a single $\mu$ that is good for all conditions, $\mu$ can vary for a detector 14N based on the input from other detectors 14A-N−1. By way of explanation, in one exemplary scenario a previous detector 14A may optimize its results for $\mu$. The optimization technique can be linear optimization, physical model or Bayesian optimization. The corrected weighting factor may be used by an algorithm performed by controller 12 in order to enable minimization of the modeled spectra and the results from the detector 14A. In one example the updated weighting factor is utilized in the AIC to minimize the Kullback-Leibler divergence between the model and the unknown true composition.

The controller 12 is configured to correlate data from the plurality of detectors 14A-N for individual ones of the objects 16, and determine a security risk for individual ones of the objects 16 based on the correlated information. In one example, each detector 14 provides its own risk assessment, and the controller 12 provides a global risk assessment based on the combined discrete risk assessments of the individual detectors 14A-N. In an example, the situational awareness detector 14A, the prioritization detector 14B, and at least one standoff detector 14C-N each provide a threat determination about an object 16 to the controller 12. The controller 12 utilizes the output of the detectors 14C-N to assign a threat level to the object 16 to determine the risk. The assigned threat level is the output from fusing the output from the detectors 14A-N. In one example the fusing of data is accomplished using one of a central limit theorem, Kalman filter, Bayesian networks, Dempster-Shafer or a convolutional neural network.

Figure 3:
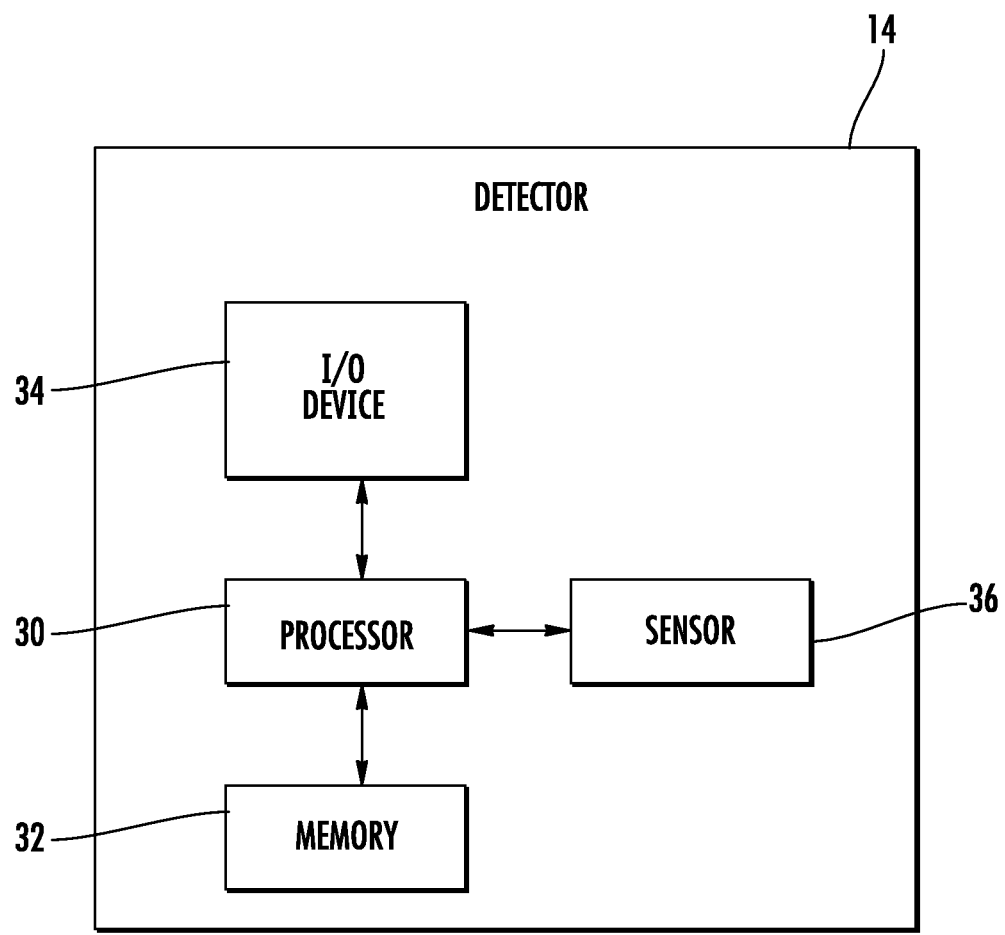
FIG. 3 is a schematic view of an example detector.

FIG. 3 is a schematic view of an example hardware configuration for a detector 14 in which the detector 14 includes a processor 30, memory 32, one or more input/output ("I/O") devices 34, and one or more sensors 36. The processor 30 includes one or more microprocessors, microcontrollers, application specific integrated circuits (ASICs), or the like, for example.

The memory 32 includes any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 32 may incorporate electronic, magnetic, optical, and/or other types of storage media. The memory 32 can also have a distributed architecture, where various components are situated remotely from one another, but can be accessed by the processor 30.

The memory 32 stores program instructions that configure the processor 30 to utilize the sensor(s) 36 to detect information about an object 16. For some detectors, such as in the example of a chemical sniffer 14, the memory 32 may also store data which may be used to identify hazardous conditions, such as a detection library of prohibited chemical compounds and their signatures.

The configuration of the sensor(s) 36 may vary depending on a type of the detector 14. For example, in one example chemical sniffer 14, the one or more sensors 36 may include a surface plasmon resonance (SPR) sensing element to detect information about an analyte sampled from an object 16. In one example, the one or more sensors 36 may include an imaging sensor configured to obtain images of an object 16 as part of an X-ray scanner 14, millimeter wave scanner 14, or optical scanner 14.

The one or more I/O devices 34 may be configured to communicate with the controller 12 and/or with other detectors 14.

Figure 4:
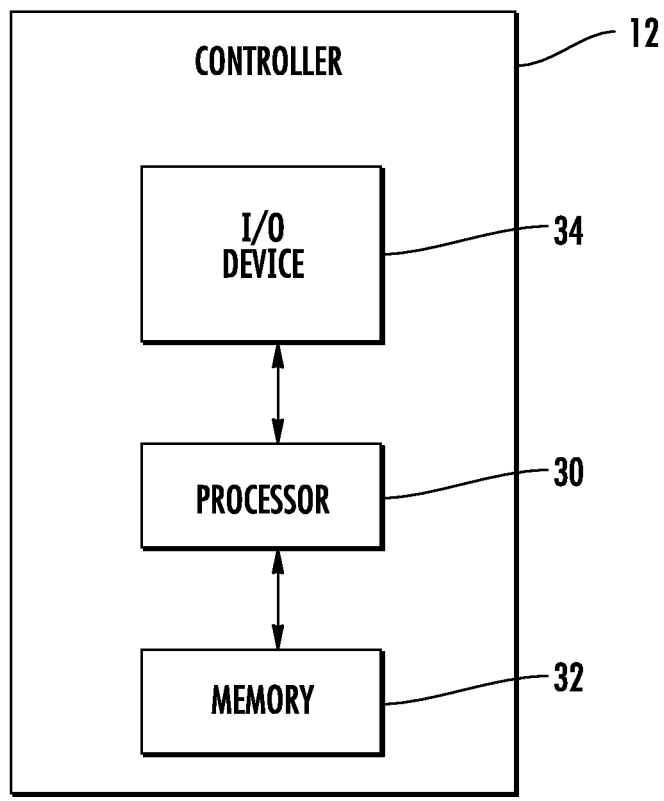
FIG. 4 is a schematic view of an example controller.

As shown in FIG. 4, the controller 12 and/or 112 utilizes a similar architecture to what is shown in FIG. 3, and similarly includes a processor 30, memory 32, and one or more I/O devices 34 that provides for communication between the controller 16 and detectors 14A-N.

Figure 5:
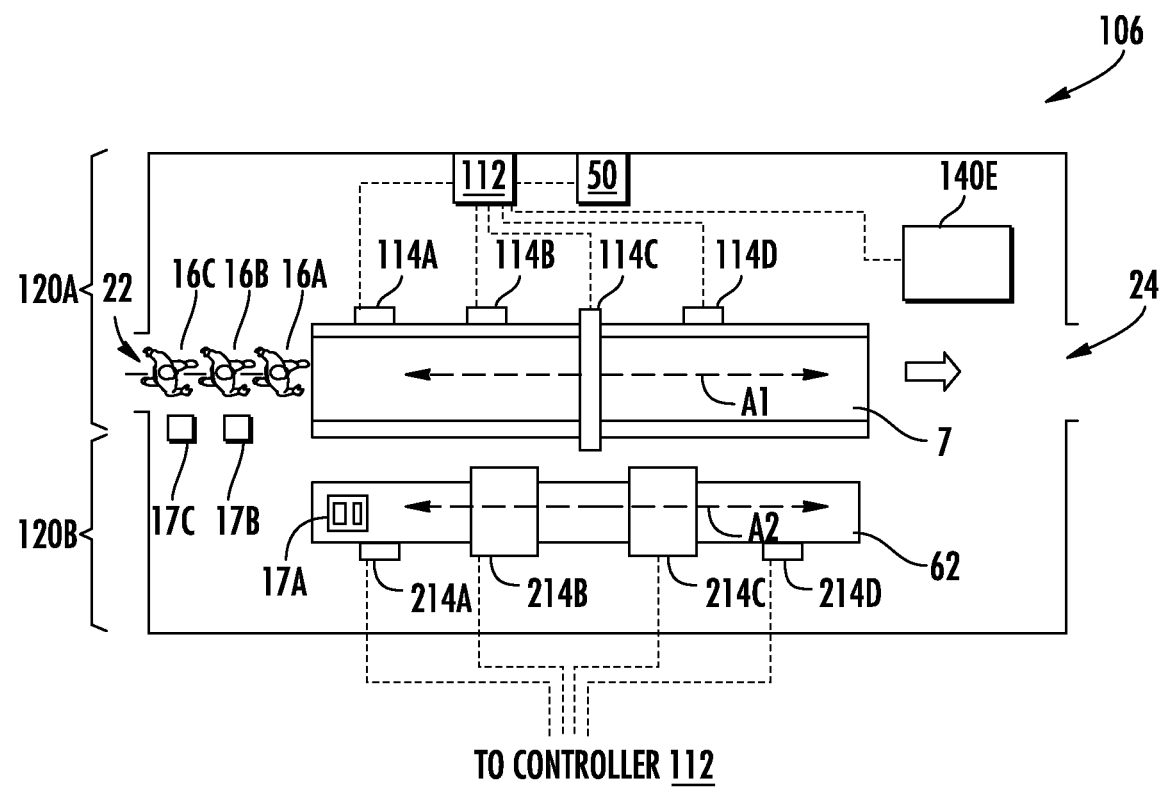
FIG. 5 schematically illustrates an example implementation of the screening system of FIG. 2.

FIG. 5 illustrates an example implementation of the screening system 106. In this disclosure, like reference numerals designate like elements where appropriate and reference numerals with the addition of one-hundred or multiples thereof designate modified elements that are understood to incorporate the same features and benefits of the corresponding elements.

The screening system 106 includes a screening area 120 including a first screening area 120A for one or more first objects 16 (e.g., people), and a second screening area 120B for one or more second objects 17 associated with particular ones of the first objects (e.g. belongings of the people 16), such as baggage 17 or personal items 17. A moving walkway 7 in the first screening area 120A is configured to move the first objects 16 from an entrance 22 towards an exit 24 of the screening area 120. A conveyor 62 in the second screening area 120B is configured to move the second objects 17 towards the exit 24 as well. In the example of FIG. 5, the moving walkway 7 moves along longitudinal axis A1, and the conveyor 62 moves along longitudinal axis A2 that is generally perpendicular to longitudinal axis A1.

Detectors 114A-E may be situated along the moving walkway 7 for detecting information from the first objects 16 on the moving walkway 7. Detectors 214A-D may be situated along the conveyor 62 for obtaining information from the second objects 17.

The controller 112 is in communication with the detectors 114A-E and 214A-D and an imaging device 50.

The imaging device 50 may be configured to record images of first objects 16 moving along moving walkway 7 and associated second objects 17 moving along conveyor 62. The controller 112 may be configured to associate a second object 17 with a first object 16 based on images from the imaging device 50 (e.g., associate a person or people 16 with one or more suitcases or personal items 17), and correspondingly correlate information from detectors 114 for a specific first object 16 with information from detectors 214 for that specific first object's associated second object(s) 17. In one example, this includes performing facial recognition for a person 16 for identification purposes (e.g., maintaining a historical log of passenger scanning information).

The correlated information for a first object 16 is used to determine a security risk for a first object 16. The controller 112 is configured to correlate information from the plurality of detectors 114 that are inspecting the first object 16, and determine a security risk for the first object 16 based on the correlated data. In one example, the controller 112 assigns the detector output to the first object 16 via an electronic tag. The tag is a unique identification that enables information with the same tag to be correlated. The tagged data transmitted to the controller 112 is then compared to known thresholds to determine the security risk.

In one example, the controller 112 is configured to change how one or more of the detectors 114 analyze a first object 16 based on data from one or more of the detectors 214 for one or more second objects 17 associated with the first object 16. For example, the controller 112 may change how one or more of the detectors 114 analyze a person 16 or people 16 based on data from one or more of the detectors 214 for one or more items of personal belongings 17 such as baggage. In one example, tracking of first object(s) 16 and second object(s) 17 can be achieved using one or more detectors 14 that includes a video camera or series of video cameras. Such detectors may include detectors 114 or detectors 214, or separate detectors 14 deployed about the screening area (i.e., in or proximate to the screening area 120). As described below, the association may be made between first object(s) 16 and second object(s) 17 via algorithms in the controller 12 before the first object(s) 16 and second objects 17 are separated in the screening system 106.

For example, the tracking and association algorithm in controller 112 may include Kalman and Particle filters for tracking moving objects such as people 16 and/or personal belongings 17 in surveillance video. As detectors 214 inspect the second objects 17 they may output one, some, or all of a risk level, a potential threat, and/or threat class associated with each of the second objects 17. This output is then sent to the controller 112. In some embodiments the detectors 214 may provide raw or processed sensor data to the controller 112 which will evaluate one, some, or all of a risk level, a potential threat, and/or threat class associated with each of the second objects 17. Subsequently the controller 112 may update the detectors 114 that are screening the first objects 16 to confirm or mitigate a determined security risk by modifying the functionality of detectors 114, e.g. by modifying dictionaries or weighting factors of the detectors 114. As used herein, a threat or threat class can include any of the following, for example: chemical warfare agents (CWA), biological warfare agents (BWA), toxic industrial chemicals, explosives, narcotics, radiological materials, and other chemicals and materials hazardous to humans, animals, or property.

In one example, the controller 112 may change how one or more of the detectors 214 analyze a second object 17 algorithmically associated with a first object 16 based on data from one or more of the detectors 114 for the first object 16. For example, the controller 112 may change how one or more of the detectors 214 analyze one or more personal belongings 17, such as baggage, based on data from one or more of the detectors 114 for a person 16 or group of people 16.

For example, a video camera or series of video cameras may be used to track of first object(s) 16 and second objects 17. As previously described, one or more tracking and association algorithms in controller 112, which may include Kalman and Particle filters for tracking moving objects, may associate first object(s) 16 and second object(s) 17 before the first object(s) 16 and second objects 17 are separated in the screening system 106. As detectors 114 inspect each first object 16 they may output one, some, or all of a risk level, a potential threat, and/or threat class associated with the first object 16. In some embodiments the detectors 114 may provide raw or processed sensor data to the controller 112 which will evaluate one, some, or all of a risk level, a potential threat, and/or threat class associated with each of the first objects 17. This output is then sent to the controller 112. Subsequently the controller 112 may update the remaining detectors 214 that are screening the second object(s) 17 to confirm or mitigate the determined security risk by modifying the functionality of detectors 214, e.g. by modifying dictionaries or weighting factors of the detectors 214.

In one example, the imaging device 50 also functions as an optical detection device by analyzing image data to detect biological or behavior characteristics of a first object 16 such as a person (e.g., body temperature above a predefined threshold, sweatiness, fidgeting, bulkiness, etc.). These characteristics can be indicative of a person 16 intending to inflict harm. For example, an elevated body temperature above a predefined threshold, sweating, and/or fidgeting (e.g., more than a predefined amount of typical human movement) can be indicative of a high stress response of the person 16. Also, bulkiness can be indicative that a person 16 may be concealing a prohibited object such as a weapon. In one particular example, the imaging device 50 is configured to detect an infrared signature of a person 16 to determine if the body temperature of that person is elevated above a predefined threshold.

In one example, the detectors 114A-B are chemical sniffers that include detection libraries, and chemical sniffer 114B has a detection library responsive to vary based on the readings of chemical sniffer 114A, e.g. chemical sniffer 114B may be configured to reduce its detection library or select a specific detection library based on the findings of chemical sniffer 114A. In one example, detector 114C is a metal detector (e.g., a pulse induction metal detector), detector 114D is another chemical sniffer 114D, and detector 114E is a millimeter wave scanner that is reserved for humans flagged as having a risk above a predefined threshold based on the output of scanners 114A-D and/or 214A-D.

In one example, detectors 214A and 214D are chemical sniffer detectors having detection libraries, at least one of 214A and 214D having a variable detection library, and detectors 214B-C are X-ray detectors, where detector 214D similarly alters its functionality based on the findings of detector 214A.

Figure 6:
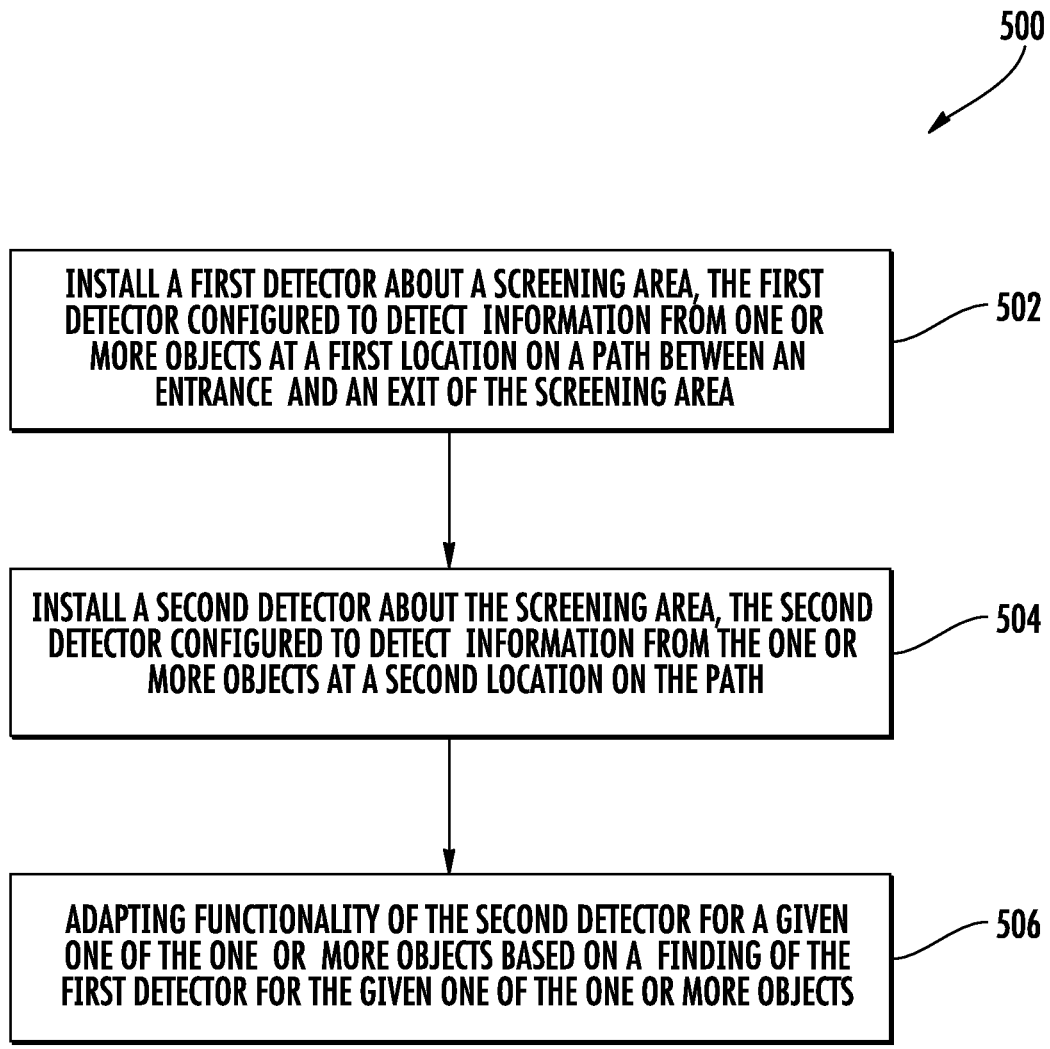
FIG. 6 is a flowchart of an example method of installing detectors about a screening area.

FIG. 6 is a flowchart 500 of an example method of installing detectors about a screening area. A first detector 14A is installed about a screening area 20 (step 502). The first detector 14A is positioned to detect information from objects 16 at a first location 21A on the path 18 between the entrance 22 and the exit 24 of the screening area 20. A second detector 14B is installed about the screening area 20 (step 504). The second detector 14B is positioned to detect information from objects 16 at a second location 21B on the path 18 that is subsequent to the first location 21A along the path 18 from the entrance 22 to the exit 24. Functionality of the second detector 14B is adapted for a given one of the one or more objects 16 based on a finding of the first detector 14A for the given one of the objects (step 506).

Instead of traditional checkpoints where a scanner becomes a bottleneck for large crowds, in the screening systems 6 described herein, objects are scanned as they move without significant delay throughout a screening area 20 (e.g., either moving down a hallway or on an automated transport device such as a conveyor belt or moving walkway). By performing scanning while objects 16 are moving, the time during which an object 16 is screened is increased without causing bottlenecks associated with stationary scanning.

Prior art checkpoint screening processes are slow, which can cause excessive wait times and occupy a large amount of floor space in transportation facilities for queuing items to be scanned. The systems described herein increase the throughput of people at a checkpoint by integrating object movement and detectors. This provides reduced wait times and an improved travel experience, and also provides increased automation of checkpoint security functions.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A screening system comprising:
 a plurality of detectors about a screening area, each detector comprising a sensor configured to detect information from one or more objects moving along a path from an entrance to an exit of the screening area, the plurality of detectors comprising a first detector configured to detect information from a first location of the path, and a second detectorconfigured to detect information from a second location of the path;
 wherein the first and second detectors are each configured to analyze chemical information from the one or more objects;
 wherein the second detector is configured to adapt its functionality based on a finding of the first detector for a given one of the one or more objects, by adapting a visible illumination intensity used by the second detector; and
 wherein the second detector is configured to utilize a detection library of restricted compounds and is configured to eliminate one or more compounds from the detection library from consideration for a particular one of the one or more objects based on the chemical information gathered by the first detector for the particular one of the one or more objects.

2. The screening system of claim 1, wherein the detection library comprises at least one of the following groups of restricted compounds: chemical warfare agents, biological warfare agents, toxic industrial chemicals, explosives, narcotics, and radiological materials.

3. The screening system of claim 1, wherein the chemical information gathered by the first detector is a fluorescent response of an analyte sampled from the given one of the one or more objects.

4. The screening system of claim 1, comprising:
 a controller comprising a processor configured to correlate data from the plurality of detectors for the given one of the one or more objects, and determine a security risk for the given one of the one or more objects based on the correlated data.

5. The screening system of claim 4, wherein the one or more objects are first objects and the screening area is a first screening area, the screening system comprising:
 a third detector situated in a second screening area that is separate from the first screening area, the third detector configured to detect information from one or more second objects associated with particular ones of the one or more first objects;
 wherein the controller is configured to further base its determination of the security risk for the given one of the first objects on data from the third detector for a given one of the one or more second objects that is associated with the given one of the first objects.

6. The screening system of claim 5, wherein the controller is configured to change how the third detector analyzes a particular one of the second objects based on data from one or more of the detectors for a particular one of the first objects that is associated with the particular one of the second objects.

7. The screening system of claim 6, wherein the controller is configured to modify a dictionary or one or more weighting factors that the third detector uses to analyze the particular one of the second objects based on the data from one or more of the detectors for the particular one of the first objects that is associated with the particular one of the second objects.

8. The screening system of claim 5, wherein the controller is configured to change how one or more of the plurality of detectors analyze a particular one of the first objects based on data from the third detector for a particular one of the second objects that is associated with the particular one of the first objects.

9. The screening system of claim 8, wherein the controller is configured to modify a dictionary or one or more weighting factors that one of the detectors uses to analyze the particular one of the first objects based on the data from one or more of the detectors for the particular one of the second objects that is associated with the particular one of the first objects.

10. The screening system of claim 5, comprising:
a conveyor configured to move the one or more second objects through the second screening area.

11. The screening system of claim 4, comprising an imaging device configured to record images of objects moving along the path, wherein the controller is configured to correlate the images of individual ones of the first objects with the data from the plurality of detectors for those individual objects.

12. The screening system of claim 11, wherein the controller is configured to assign an electronic tag to images of a particular first object and to data related to the first object from one or more of the detectors as part of the correlation.

13. The screening system of claim 11, wherein the objects are humans, and the imaging device is a third detector configured to screen the humans for one or more biological or behavioral characteristics.

14. The screening system of claim 13, wherein the one or more bodily threat indications comprise one or more of body temperature above a predefined threshold, sweating, fidgeting, and human bulkiness.

15. The screening system of claim 1, further comprising an automated transport device configured to move the objects from the entrance to the exit of the screening area along the path.

16. The screening system of claim 15, wherein the automated transport device comprises a moving walkway.

17. The screening system of claim 16, wherein moving walkway comprises a skirt guard, and at least one of the first and second detectors is disposed within the skirt guard, the skirt guard comprising at least one aspirating inlet that provides fluid communication between the object and said at least one of the plurality of detectors.

18. The screening system of claim 1,
wherein to adapt its functionality based on the finding of the first detector, the second detector is also configured to adapt its dwell time.

19. The screening system of claim 1, wherein to adapt its functionality based on the finding of the first detector, the second detector is also configured to adapt its wavelength.

20. The screening system of claim 1, wherein to adapt its functionality based on the finding of the first detector, the second detector is also configured to adapt its detection threshold.

21. A method of installing detectors about a screening area, comprising:
installing a first detector about a screening area, the first detector configured to detect and analyze chemical information from one or more objects at a first location on a path between an entrance and an exit of the screening area;
installing a second detector about the screening area, the second detector configured to detect and analyze chemical information from the one or more objects at a second location on the path that is different from the first location using a detection library of restricted compounds, wherein the first and second detectors are each configured to analyze chemical information from the one or more objects;
adapting functionality of the second detector fora given one of the one or more objects based on a finding of the first detector for the given one of the one or more objects by adapting a visible illumination intensity used by the second detector; and
eliminating one or more compounds from the detection library of the second detector from consideration for the given one of the one or more objects based on the chemical information gathered by the first detector for the given one of the one or more objects.

22. The method of claim 21, wherein the path comprises a moving walkway configured to move the objects towards the exit, and the first and second locations are locations along the moving walkway.

* * * * *